(12) United States Patent　　(10) Patent No.: US 12,491,673 B1
Roudebush　　(45) Date of Patent: Dec. 9, 2025

(54) SYSTEMS, APPARATUS, AND METHODS FOR CREATING THIN PLASTIC FILMS

(71) Applicant: Paragon Films, Inc., Broken Arrow, OK (US)

(72) Inventor: Tom Roudebush, Broken Arrow, OK (US)

(73) Assignee: Paragon Films, Inc., Broken Arro, OK (US)

( * ) Notice: Subject to any disclaimer, the term of this patent is extended or adjusted under 35 U.S.C. 154(b) by 158 days.

(21) Appl. No.: 18/154,438

(22) Filed: Jan. 13, 2023

Related U.S. Application Data

(60) Provisional application No. 63/299,275, filed on Jan. 13, 2022.

(51) Int. Cl.
*B29C 48/00*　　(2019.01)
*B29C 48/08*　　(2019.01)
*B29C 48/21*　　(2019.01)
*B29C 53/04*　　(2006.01)
*C08L 23/12*　　(2006.01)
*B29K 23/00*　　(2006.01)

(52) U.S. Cl.
CPC ...... *B29C 48/0019* (2019.02); *B29C 48/0022* (2019.02); *B29C 48/08* (2019.02); *B29C 48/21* (2019.02); *B29C 53/043* (2013.01); *C08L 23/12* (2013.01); *B29K 2023/0625* (2013.01); *B29K 2023/12* (2013.01); *C08L 2203/16* (2013.01)

(58) Field of Classification Search
CPC .. B65H 2701/11234; B65H 2701/1123; B65H 45/22; Y10T 428/2419; Y10T 156/1015; Y10T 156/1051; B29C 53/02; B29C 53/04; B29C 53/043; B29C 48/0019
See application file for complete search history.

(56) References Cited

U.S. PATENT DOCUMENTS

| | | | |
|---|---|---|---|
| 1,843,087 | A | 1/1932 | Luitwieler |
| 2,128,664 | A | 8/1938 | Sackner |
| 2,897,729 | A | 8/1959 | Ashton |

(Continued)

FOREIGN PATENT DOCUMENTS

| | | |
|---|---|---|
| CA | 2068908 | 11/1993 |
| CA | 2319302 | 4/2001 |

(Continued)

OTHER PUBLICATIONS

TAPPI Second, "Film Extrusion Manual", Second Edition, 2005, pp. 1-648.

(Continued)

*Primary Examiner* — Atul P. Khare
(74) *Attorney, Agent, or Firm* — Ruggiero McAllister & McMahon LLC; Edward L McMahon

(57) ABSTRACT

A multi-layer plastic film is describe herein that comprises at least one first layer comprising a metallocene linear low density polyethylene (mLLDPE) octene resin, at least one second layer comprising a linear low density polyethylene (LLDPE) octene resin, at least one third layer comprising a polypropylene (PP) resin, wherein the at least one third layer comprises one of a metallocene homopolymer polypropylene (mHPP) resin, a random copolymer polypropylene (RCPP) resin, and a metallocene polypropylene (mPP) resin. The multi-layer plastic film comprises a thickness of six microns or less.

25 Claims, 17 Drawing Sheets

(56) References Cited

U.S. PATENT DOCUMENTS

| | | |
|---|---|---|
| 3,055,605 A | 9/1962 | Young |
| 3,058,402 A | 10/1962 | Kugler |
| 3,298,624 A | 1/1967 | Schott |
| 3,377,032 A | 4/1968 | Jacobs |
| 3,383,062 A | 5/1968 | Meihofer |
| 3,399,096 A | 8/1968 | Ranger |
| 3,472,462 A | 10/1969 | Young |
| 3,697,010 A | 10/1972 | Nystrand |
| 3,733,035 A | 5/1973 | Schott |
| 3,978,191 A | 8/1976 | Allen |
| 4,004,747 A | 1/1977 | Schulze |
| 4,092,839 A | 6/1978 | Bahre et al. |
| 4,171,107 A | 10/1979 | Kayser |
| 4,252,154 A | 2/1981 | Alexander, III |
| 4,390,139 A | 6/1983 | Alexander, III |
| 4,492,257 A | 1/1985 | Alexander, III |
| 4,495,124 A | 1/1985 | Van Erden |
| 4,697,755 A | 10/1987 | Kataoka |
| 4,763,852 A | 8/1988 | Smith |
| 4,905,451 A | 3/1990 | Jaconelli |
| 4,932,932 A | 6/1990 | Schmidt |
| 5,013,595 A | 5/1991 | Parry |
| 5,168,685 A | 12/1992 | Suzuki |
| 5,246,416 A | 9/1993 | Demura |
| 5,417,382 A | 5/1995 | Petit |
| 5,447,009 A | 9/1995 | Oleksy |
| 5,458,841 A | 10/1995 | Shirrell |
| 5,494,237 A | 2/1996 | Summey, III |
| 5,520,872 A | 5/1996 | Scherer |
| 5,531,393 A | 7/1996 | Salzsauler |
| 5,565,222 A | 10/1996 | Scherer |
| 5,626,944 A | 5/1997 | Rasmussen |
| 5,845,867 A | 12/1998 | Hould |
| 5,850,982 A | 12/1998 | Roth |
| 5,909,856 A | 6/1999 | Myer |
| 5,942,080 A | 8/1999 | Mortellite |
| 5,967,437 A | 10/1999 | Martin-Cocher |
| 6,102,313 A | 8/2000 | Salzsauler |
| 6,170,772 B1 | 1/2001 | Martin-Cocher |
| 6,354,531 B1 | 3/2002 | Aalto |
| 6,375,781 B1 | 4/2002 | Wojcik |
| 6,394,330 B1 | 5/2002 | Jackson |
| 6,592,699 B1 | 7/2003 | Mehta |
| 6,713,010 B1 | 3/2004 | Doran |
| 7,896,283 B2 | 3/2011 | Tauber |
| 8,053,056 B2 | 11/2011 | Heikaus |
| 8,100,356 B2 | 1/2012 | Pirtle et al. |
| 8,221,298 B2 | 7/2012 | Pirtle et al. |
| 8,475,349 B2 | 7/2013 | Pirtle et al. |
| 8,777,829 B2 | 7/2014 | Pirtle et al. |
| 10,047,203 B2 * | 8/2018 | Pirtle ................ C08L 23/04 |
| 10,500,824 B2 * | 12/2019 | Pirtle .................. B29C 48/875 |
| 2003/0189118 A1 | 10/2003 | Smith |
| 2004/0048019 A1 | 3/2004 | Ohlsson |
| 2005/0044812 A1 | 3/2005 | Lancaster |
| 2005/0123721 A1 | 6/2005 | Heikaus |
| 2005/0127231 A1 | 6/2005 | Pasquale |
| 2006/0243842 A1 | 11/2006 | Saldana |
| 2006/0289691 A1 | 12/2006 | Forni |
| 2007/0178278 A1 | 8/2007 | Clarke |
| 2008/0260305 A1 | 10/2008 | Shah |
| 2012/0108410 A1 | 5/2012 | Perego |
| 2013/0059714 A1 | 3/2013 | Yamamoto |
| 2014/0144589 A1 * | 5/2014 | Pirtle ................ B29C 53/005 |
| | | 156/461 |
| 2014/0327175 A1 * | 11/2014 | Pirtle .................. B29C 48/21 |
| | | 264/173.16 |
| 2014/0329655 A1 * | 11/2014 | Pirtle .................. B65H 45/22 |
| | | 493/360 |
| 2017/0028595 A1 * | 2/2017 | Baab ................ B29C 39/38 |
| 2023/0202154 A1 * | 6/2023 | Roudebush ............ B01D 29/05 |
| | | 428/192 |

FOREIGN PATENT DOCUMENTS

| | | |
|---|---|---|
| CA | 2334401 | 8/2001 |
| CA | 2702295 | 4/2009 |
| CN | 2200531 | 6/1995 |
| EP | 0009376 A2 | 4/1980 |
| EP | 0466980 A1 | 1/1992 |
| EP | 0531021 B1 | 1/1996 |
| GB | 1507212 | 4/1978 |
| JP | H0475966 | 3/1992 |
| JP | 0473107 | 3/1999 |
| JP | 2007-1200 | 1/2007 |
| KR | 960006137 | 7/1996 |
| WO | 2014210610 | 12/2014 |
| WO | 2020221754 | 11/2020 |

OTHER PUBLICATIONS

Roisum, David R., "The Mechanics of Web Handling" (1998), 21 pages.

Schut, Jan H., "Winders: They're Pushing New Limits in Speed and Tension Control", Plastics Technology, (Feb. 2004), https://web.archive.org/web/20040304055051/http://www.plasticstechnology.com/articles/200402fa1.html, 6 pages.

Walker, Timothy J., "Winding Better Rolls", Paper, Film & Foil Converter, (Jun. 2003), https://web.archive.org/web/20030906050813/http://pffconline.com/ar/paperwindingbetterrolls/index.htm, 9 pages.

* cited by examiner

T-Slot Constant Cross-Section Manifold

Prior art

SYSTEMS, APPARATUS, AND METHODS FOR CREATING THIN PLASTIC FILMS

RELATED APPLICATIONS

This application claims priority to U.S. Application No. 63/299,275, filed Jan. 13, 2022.

TECHNICAL FIELD

The disclosure herein relates generally to compositions of and methods for producing high performance plastic films (or films).

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BACKGROUND

Figure 1:
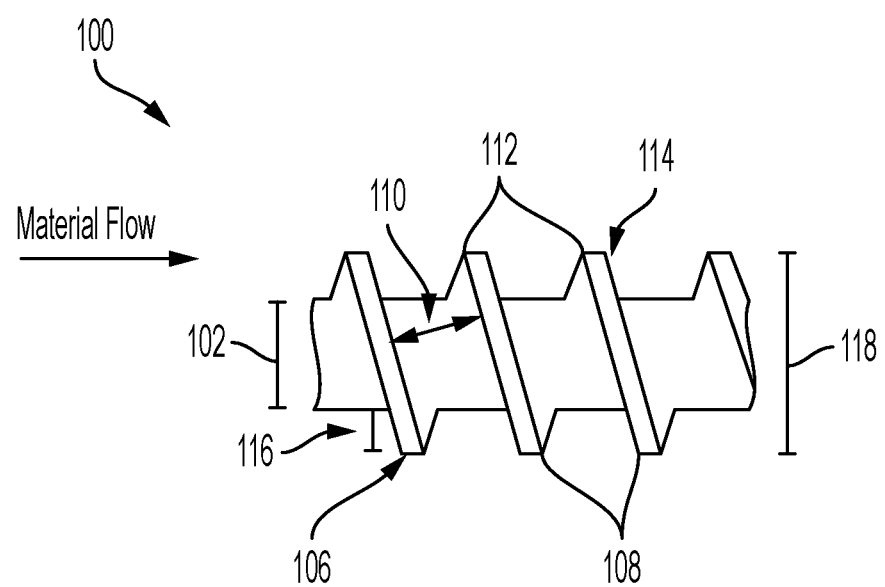
FIG. 1 shows an extruder screw, under an embodiment.

Stretch films or cast films (otherwise referred to as films or plastic films) are widely used in a variety of bundling and packaging applications. For example, stretch films have become a common method of securing bulky loads such as boxes, merchandise, produce, equipment, parts, and other similar items on pallets. Such films are typically made from various polyethylene (and/or polypropylene) resins and may be single or multilayer products.

DETAILED DESCRIPTION

Thin plastic films, e.g. films on the order of six micrometers (microns), have significant advantages of admitting to a more sustainable footprint and allowing users to accomplish a task using less film. The embodiments described herein employ in-line manufacturing processes (as further described below) to produce thinner gauge plastic films. An in line process is described that produces plastic films in a continuous uninterrupted process, wherein the process incorporates (among other steps) slitting a film, folding resulting edges, and winding the film using an oscillating and air entrapment method. The folding and winding/oscillating/air entrapment steps are described in United States Patent Nos. U.S. Pat. Nos. 8,100,356; 8,221,298; 8,475,349; and 8,777,829 which are incorporated herein by reference in their entireties. (Note that embodiments of an in line process may include additional steps, different steps, fewer steps, and/or steps in a differing order). Using embodiments of a formulation described below, an in-line process may provide functional film structures with thicknesses of 6 microns or less.

This in line process of course comprises a process of plastics extrusion, under an embodiment. Plastics extrusion is a high-volume manufacturing process in which raw plastic is melted and formed into a continuous profile. Extrusion produces plastic films among other industrial products and other materials. Typically, the cast film (otherwise referred to as stretch film, plastic film, or film) process involves the use of coextrusion, which is a simultaneous extrusion of two or more materials from a single die to form a multi-layered film. This is because in many cases the final application of the plastic film demands a performance that cannot be achieved if the film is composed of only one material. The number of layers, their position in the coextrudate and their individual thickness are all variables that change depending on the particular application of the film. Desirable properties of film include one or more of the following: Puncture Resistance, Tear Resistance, Cling, Stretch Ability, Resistance to Stretch, Clarity and/or other properties.

This process starts by feeding plastic material (pellets, granules, flakes or powders) from a hopper into the barrel of the extruder. The material is gradually melted by the mechanical energy generated by turning screws and/or by heaters arranged along the barrel. The molten polymer is then forced into a die, which shapes the polymer into a shape that hardens during cooling.

Either a volumetric or gravimetric feeding system controls supply of feed material. Gravimetric feeding systems control the amount of material that is fed into the extruders by weight, not volume. The system is more precise than its volumetric counterpart. A gravimetric feeder, also known as a loss-in-weight feeder, is a self-calibrating dosing system that doses based on weight in speed. A volumetric feeder, on the other hand, does this based on volume in speed. In gravimetric dosing, the weight of the dosed additive is measured using a load cell that is the foundation of the entire system. Weight is calculated using loss-in-weight technology, which measures the reduced weight while dosing.

A volumetric feeder is a dosing system that supplies the production system with a certain volume of material in a set timeframe, based on the so-called displacement principle. In contrast to a gravimetric feeder, the dosing speed of a volumetric feeder should be selected manually, which may vary based on the nature of the raw input materials.

A gravimetric feeder is preferred and provides the following advantages:
Self-adjusting/self-calibrating
100% control over your product quality
Easy to operate
Monitoring and reporting options Higher saving on expensive additives Fluctuations in density do not effect outcome In-sensitive to material build-up Automatic detection of material supply interruption Accurate dosing cylinder Variable motor speed The main functions of an extruder are to melt the plastics pellets and mix the resulting molten polymer to achieve a homogeneous melt. This is done by conveying the material along a barrel with a rotating screw. The material is gradually melted by the mechanical energy generated by one or more extruder screws. Additional heating may be applied. However, mechanical energy of the extruder screw may be sufficient, under an embodiment. The molten polymer is then forced into a die, which shapes the polymer into a shape.

As seen in FIG. 1, an extruder screw 100 comprises a helical structure. The laterally extending helical ribs may be referred to as flights 106, 120. The root 102 of the screw is the inner cylinder from which the helical flights laterally extend. Channel width 110 comprises a distance between flights along a line orthogonal to parallel tangential planes passing along the inner sides of neighboring flights. A helical angle 114 comprises the angle between a tangential plane passing along an edge of a flight and the longitudinal axis of the extruder screw inner cylinder (i.e., the root). Channel flight 108 and pitch 112 are the longitudinal distances between facing and successive surfaces of neighboring flights along respective lines parallel to a longitudinal axis of the root 102. A side of a flight facing in a direction of the die (or opposing material flow) comprises a pushing flight 120 while an opposing side comprises a trailing flight 106. FIG. 1 illustrates channel depth 116 as the lateral distance from an outer surface of the root to an uppermost edge of a flight measured along a line orthogonal to an axis of the root while extruder screw diameter 118 comprises lateral distance between opposing outer edges of the helical flights passing through the same axis.

Figure 2:
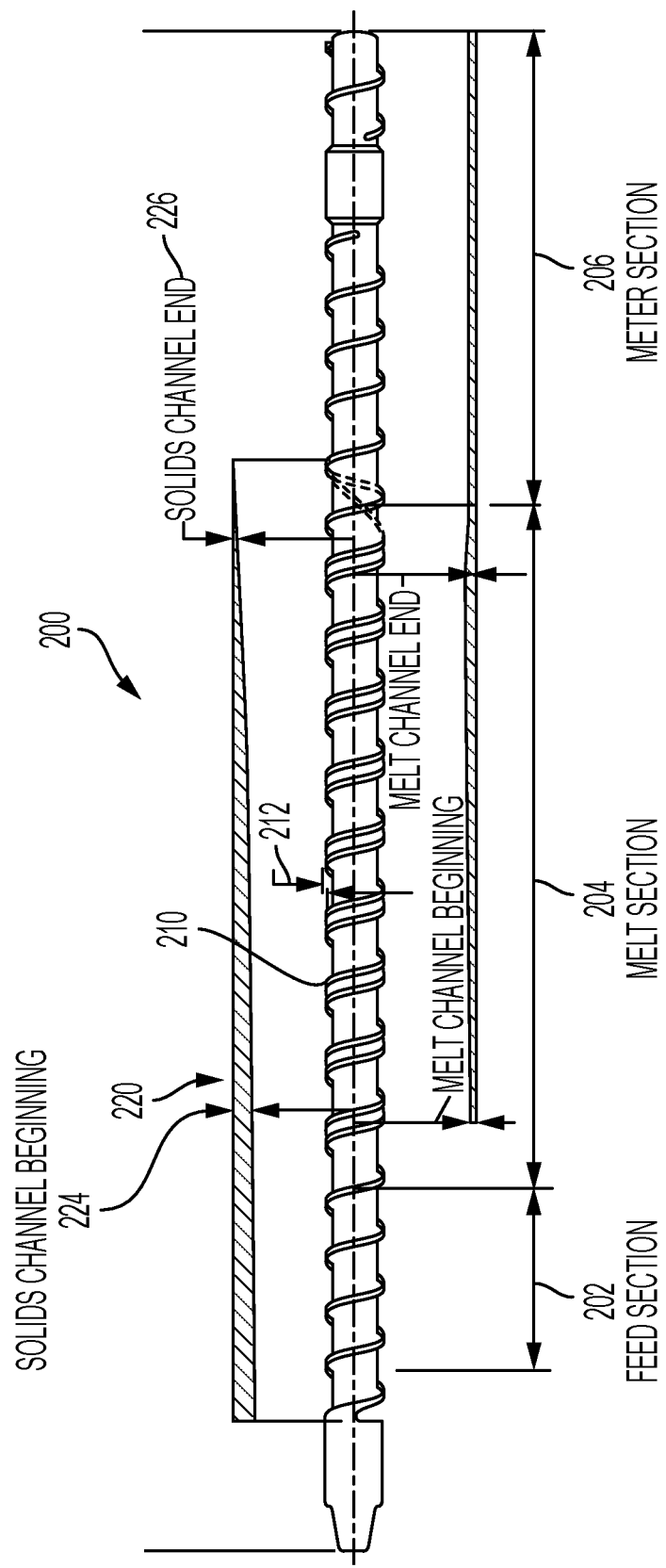
FIG. 2 shows sections of an extruder screw, under an embodiment.

FIG. 2 shows three sections of an extruder screw 200 including a feed section 202, an interior melt section 204, and metering section 206. A solids channel 220 comprises the feed section and the melt section. FIG. 2 shows a solids channel beginning 224 and a solids channel end 226. The extruder screw rotates around a longitudinal axis and pushes material forward through the feed, melt, and meter sections. The extruder screw of FIG. 2 introduces an auxiliary flight, or barrier flight, within the transition or melt section. An auxiliary flight (barrier flight) 210 in the channel is undercut and permits the passage of only fully molten plastic. An auxiliary flight undercut 212 effectively separates a "solid channel" and "melt channel." The solid channel is open to the feed or solid channel section while the melt channel is open to the metering section. As solid material melts along the length of the feed screw, the melted polymer flows over the barrier flight into the melt channel through a tight clearance. The barrier clearance prevents any unmelted pellets from flowing into the melt channel. The molten and compressed polymer then enters the metering section 206. The flight or channel depth is less than in the feeding zone. The function of the metering section is to build-up pressure. The amount of pressure that can be build-up, depends on the length of the metering zone. The metering section 206 is meant to stabilize the output and develop pressure to overcome the resistance of the die and downstream apparatus.

The melted materials or resins are then filtered and fed to a die system. The objective of the filtration system is to prevent downstream passage of melt impurities and/or gels that are formed during the extrusion process. Proper control at this stage is imperative to prevent melt contamination. The most common filters are those containing a metallic mesh. The case hosting the filter media has to be capable of bearing the forces exerted by the polymer flow when subjected to the maximum pressure allowed by the extrusion process. It is preferred to use continuous screen changers, in which the mesh is continuously regenerated, to minimize the replacement time of the screen pack.

It can be said that the die system is the heart of any coextrusion line. The die system is formed by the coextrusion feedblock, the flat die and the melt transfer adapters that transport the different molten polymers from the extruders to the feedblock inlet ports. The quality of the coextruded film and the productivity of the process are greatly dependent on the design and performance qualities of the die system.

The functions of the die are (i) to force the melt into a thin film, (ii) to maintain the melt at a constant temperature, and (iii) to meter the melt at a constant pressure and rate to the die land for uniform film gauge. The die lands generate resistance to the melt flow and build up backpressure in the die. If the land length is too short, the melt flow out of the die may be uneven. Die lips, or jaws, can be adjusted to change the die opening to control gauge uniformity.

There are two basic types of die designs: "Coat-hanger" dies and "T-slot" dies. In the coat-hanger design, the die manifold, which generally has a teardrop or half teardrop cross section, distributes the incoming melt flow across a steadily widening area. The area ahead of the land streamlines the melt into a film. The T-slot design uses a large volume, circular or teardrop-shaped manifold to minimize melt flow resistance to the die ends. This type of die is normally used with high melt flow resins. With this type of die, the formation of film edge beads is less than it is with "coat-hanger" dies. With both types of dies, a die lip gives the melt its proper cross-sectional thickness and width.

Figure 3B:
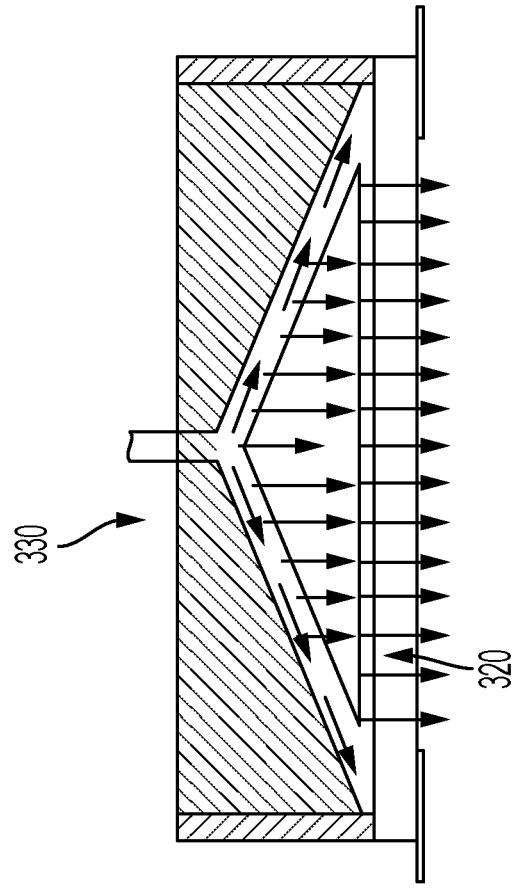
FIG. 3B shows a coat hanger die, under an embodiment.
Figure 3A:
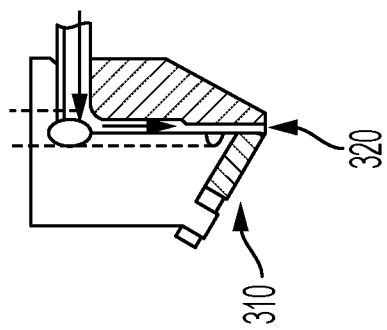
FIG. 3A shows a coat hanger die, under an embodiment.

FIG. 3A is a side cross sectional view of a coat hanger die, under an embodiment. FIG. 3A shows a die land and an adjustable jaw for adjusting width of the die land. FIG. 3B shows a front cross sectional view of a coat hander die, under an embodiment. FIG. 3B shows the coat hanger die cross sectional profile and die land.

Figure 3D:
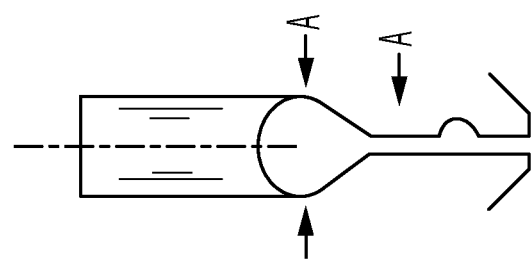
FIG. 3D shows a coat hanger die, under an embodiment.
Figure 3C:
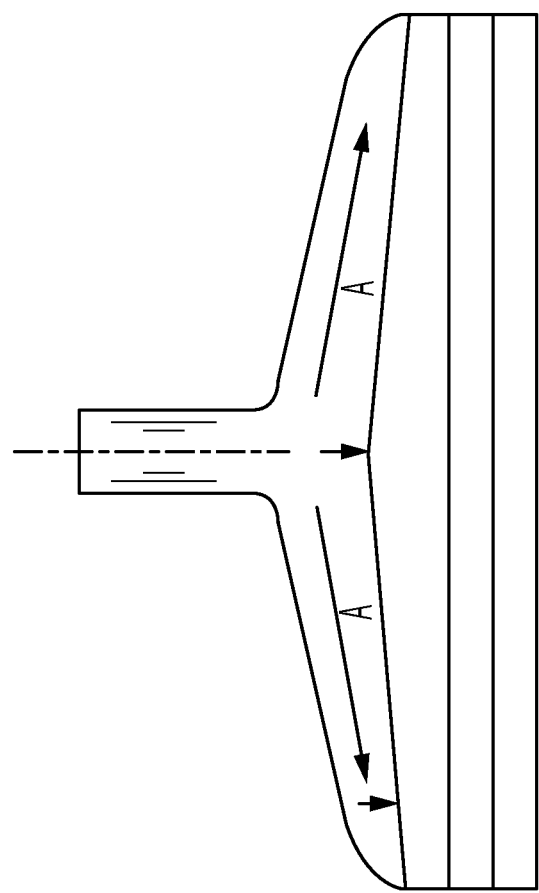
FIG. 3C shows a coat hanger die, under an embodiment.

FIGS. 3C and 3D show a front and side cross sectional view of a coat hanger die volumetrically diminishing manifold. A longitudinally directed section of the manifold decreases in width as it approaches the die land.

Figure 4B:
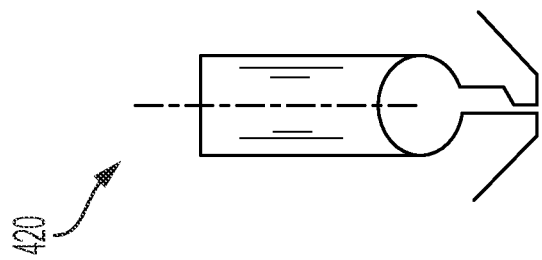
FIG. 4B shows a T-Slot die, under an embodiment.
Figure 4A:
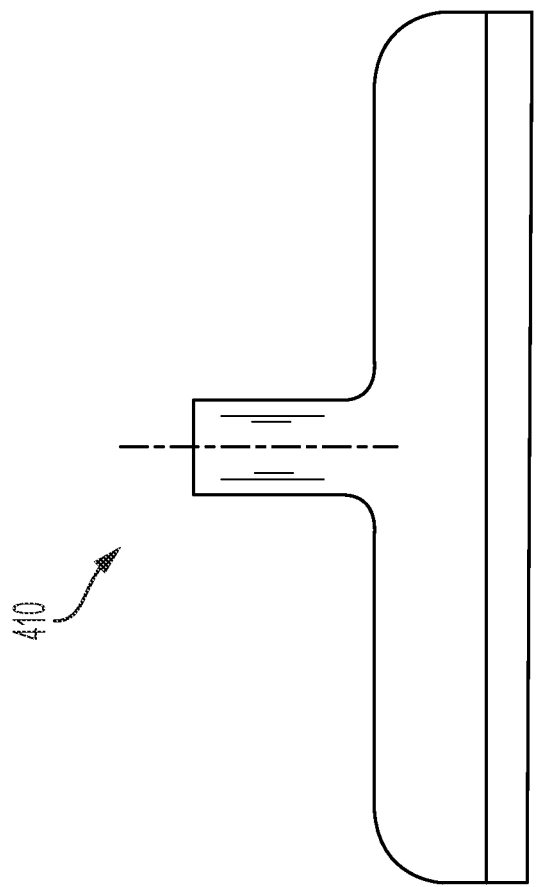
FIG. 4A shows a T-Slot die, under an embodiment.

FIGS. 4A and 4B show a front and side cross sectional view of a T-Slot constant cross section manifold, under an embodiment.

The primary function of the die system is to form a multi-layered film that is uniformly distributed across the width of the die with thickness variations on the film and thickness variations on each individual layer within industry accepted tolerances. The coextrusion feedblock arranges the different melt streams in a predetermined layer sequence and generates as many melt streams as layers are to be in the final coextrudate. Once this is done, each stream adopts a planar geometry, meets its neighboring layers and the final planar coextrudate is formed.

The coextrusion methods described below may use either a Coat Hanger or a T-Slot die.

As indicated above, coextrusion is the extrusion of multiple layers of material simultaneously. This type of extrusion utilizes two or more extruders to melt and deliver a steady volumetric throughput of different viscous plastics to a single extrusion head (die) which will extrude the materials in the desired form. Separate extruders are required for each distinct material in the coextrusion. Note that the number of extruders depends on the number of different materials being extruded and not necessarily on the number of layers. This is because the existing feedblock and die technology allows the flow from one extruder to be split into two or more layers in the final coextrudate.

Figure 5:
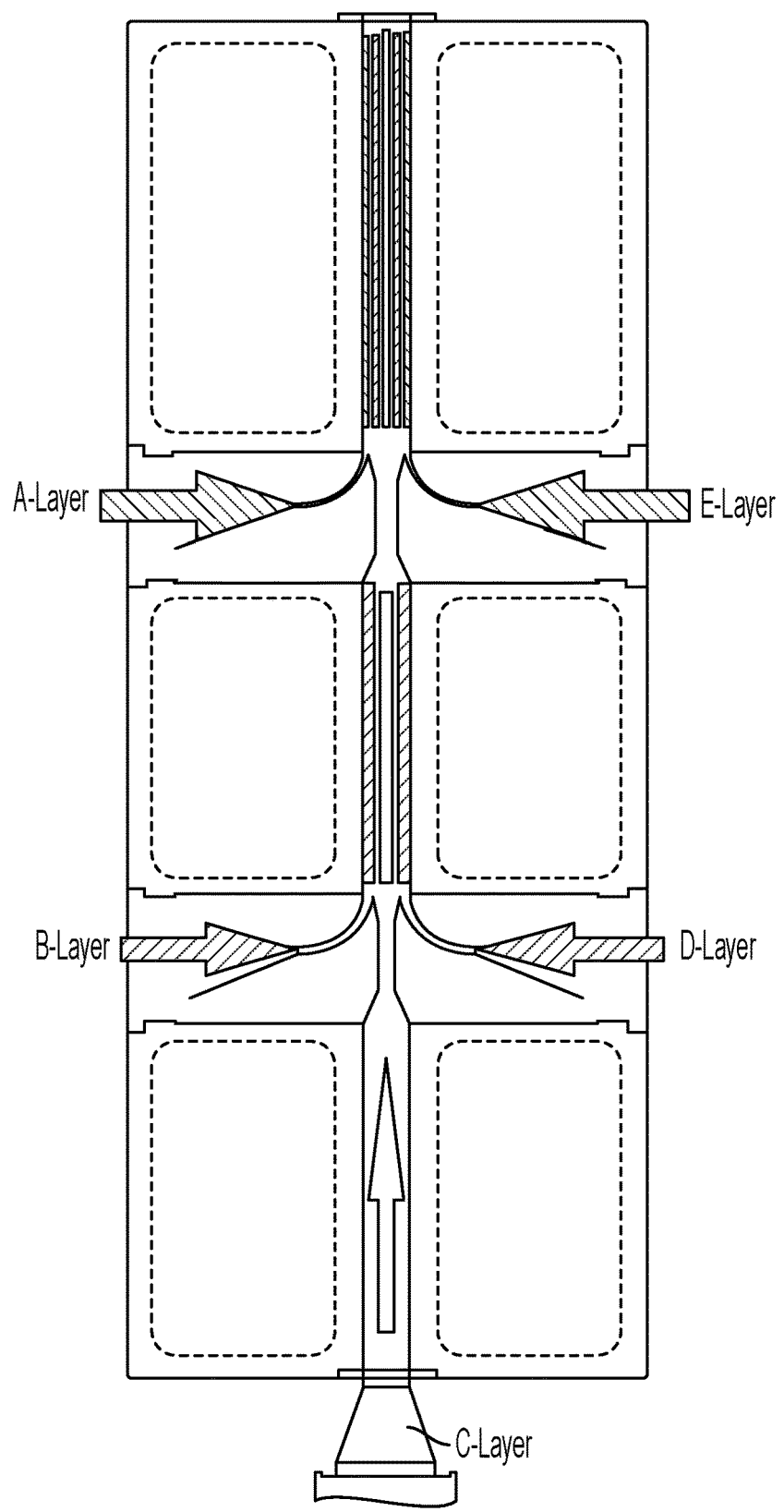
FIG. 5 shows production of a five layer film, under an embodiment.
Figure 6:
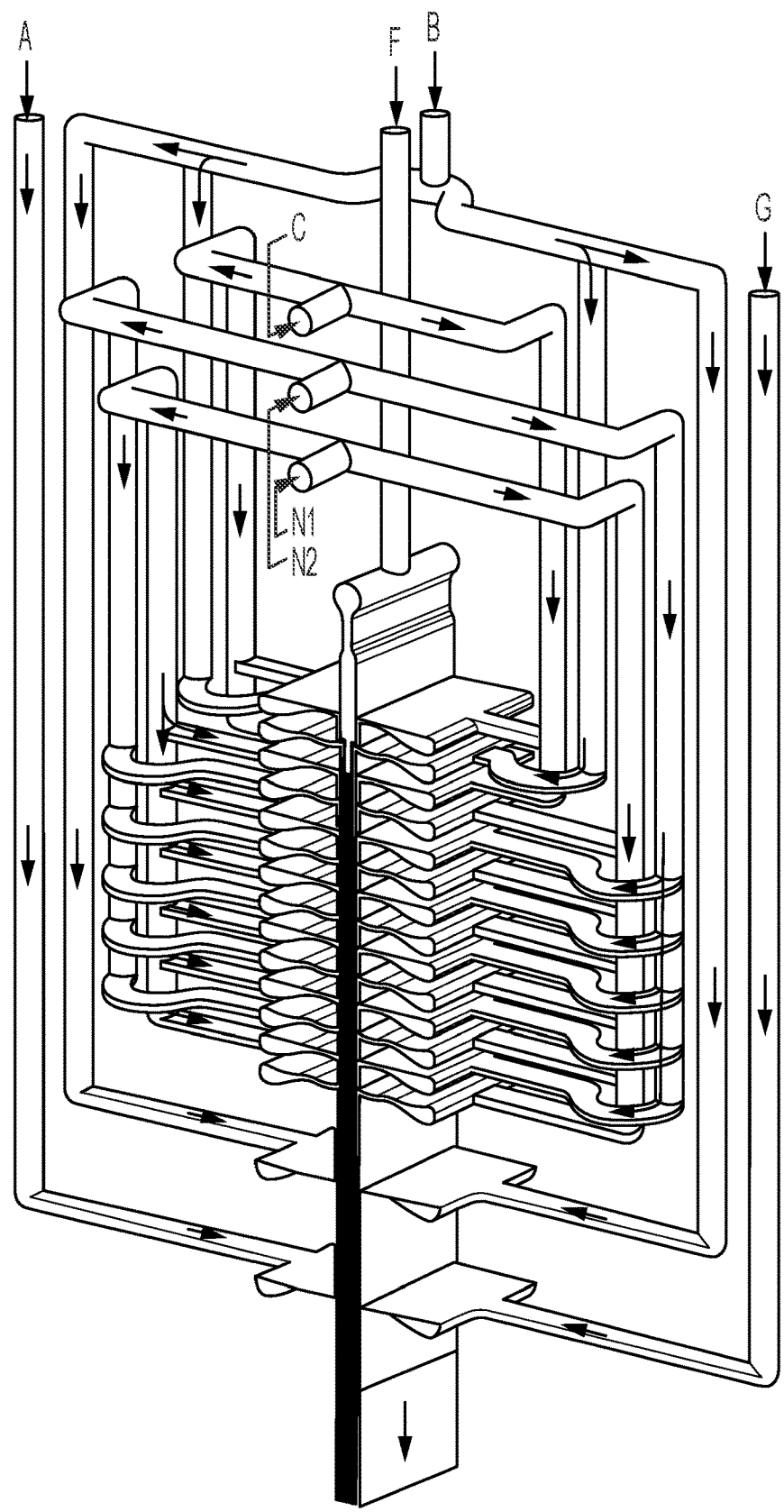
FIG. 6 shows production of a multi-layered film, under an embodiment.

FIG. 5 shows production of a five layer film. The process requires three extruders but ultimately generates a film with five layers. As seen in FIG. 5, melted resin A/E forms the two outermost layers (A/E), melted resin B/D forms the two next inner layers (B/D), while resin C forms the core layer. As seen in FIG. 6, source material A, B, C, F, G, N1, and N2 are melted and respectively branched into multiple layers.

Figure 7:
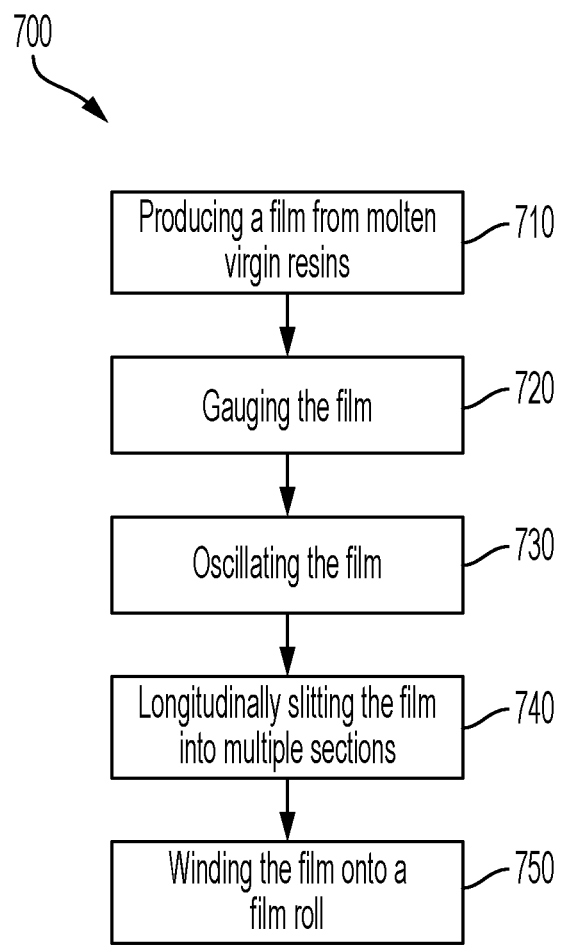
FIG. 7 shows steps for producing a film, under an embodiment.

Referring generally to FIG. 7, the steps 700 are shown for producing a cast stretch film according to one embodiment. Specifically, the steps comprise producing a film from molten resins 710, gauging the film 720, oscillating the film 730, longitudinally slitting the film into multiple sections 740, and winding the film onto a film roll 750. In some embodiments, all of the steps are performed along a single production line. However, it is also contemplated that the steps can be performed in a different order, and steps may be added or eliminated without departing from the scope of the embodiments described herein.

Figure 8:
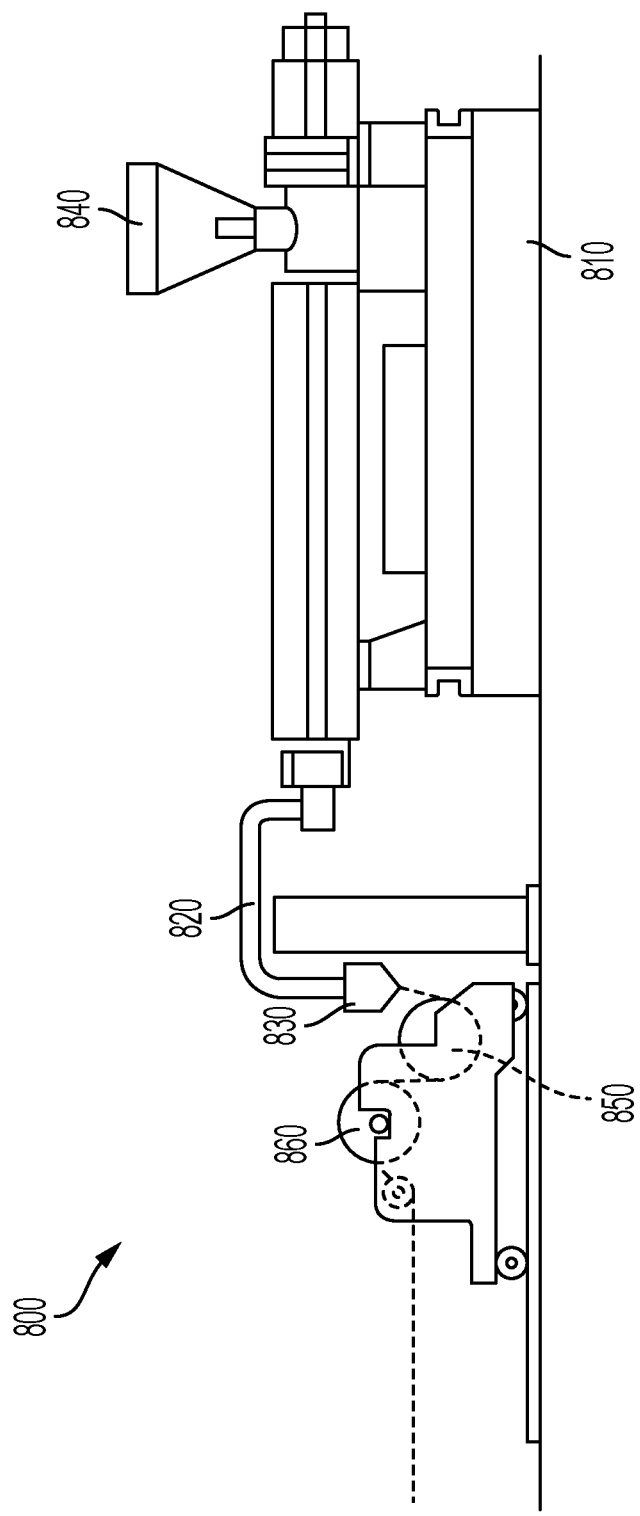
FIG. 8 shows a coextrusion line, under an embodiment.

As shown in FIG. 8, a means for producing a cast stretch film from molten resins 800 comprises one or more extruders 810 connected by transfer pipes 820 to a die 830. The number of extruders 810 used in the apparatus depends upon the desired composition of the film.

For example, to produce a three-layer film, three extruders 810 are used. In another example embodiment, to produce a five-layer film, three, four, or even five extruders 810 are used depending on the number of distinct source materials.

Under an embodiment, the extruders 810 are connected to a source 840 of stock resin. The extruders 810 heat the stock resin to a molten state and deliver the molten resin to the die 830 through the transfer pipes 820. In example embodiments, the film is extruded through the die 230 onto a casting roll 250. In further example embodiments, the casting roll 250 is 25-50 inch range casting roll having a set temperature. In still further example embodiments, the set temperature of the casting roll ranges from about 75° F. to 100° F. . . . ; in an embodiment the casting roll has a set temperature of about 90° F.

In example embodiments, the film moves from the casting roll 850 to a secondary chill roll 860. According to example embodiments, the secondary chill roll is 15-30 inch secondary chill roll with a set temperature. As a further example embodiment, the set temperature of the secondary chill roll ranges from about 65° F. to 90° F., with a preferred value of about 85° F.

In some embodiments, the film is then passed from the caster roll or the chill roll to a slitting assembly. Since slitting assemblies are used to slit the film into multiple sections, for example, into one or more interior slit sections and one or more exterior slit sections.

Figure 9:
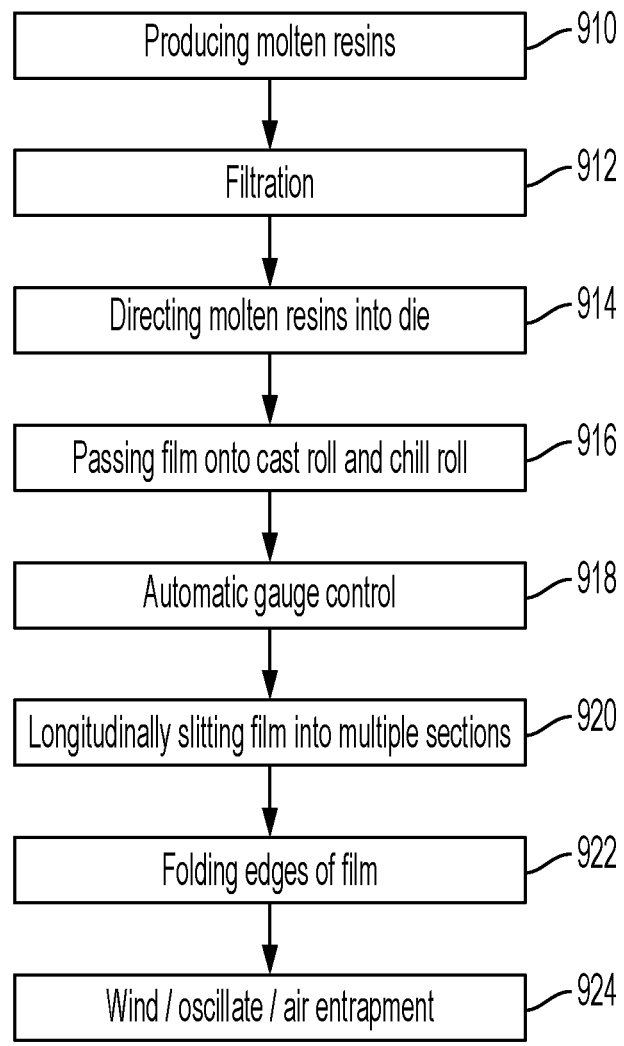
FIG. 9 shows steps for producing a film, under an embodiment.

FIG. 9 shows a means for producing a film which includes the steps of slitting, in-line folding, and winding/oscillation/air entrapment as part of one continuous and uninterrupted in-line process. FIG. 9 illustrates the steps 900 for producing plastic films in-line via a continuous process, under an embodiment. FIG. 9 illustrates production molten resins 910 using one or more extruders. The process of coextrusion is described in detail above. FIG. 9 identifies a step of filtering the molten resins 912. A continuous filter may be used, under an embodiment. The molten resins are then directed in to a die 914. Film exiting the die are directed to a cast and chill roll 916. The thickness of the film may be determined by the diameter and angular speed of the cast and chill rolls. An automatic gauge control process 918 monitors thickness of the film and provides feedback to the cast and chill roll mechanism in order to control, adjust, and maintain target thickness in real time. The process then longitudinally slits 920 the film into a plurality of sections and folds 922 edges of the film. As seen in FIG. 9, the process then implements a winding/oscillation/air entrapment 924 process. This step prevents stacking of the edge folds and entraps air between the layers of film. All of the steps may be performed in-process along a single production line. The steps may be performed in a different order, and one or more steps may be eliminated, under alternative embodiments.

Figure 10:
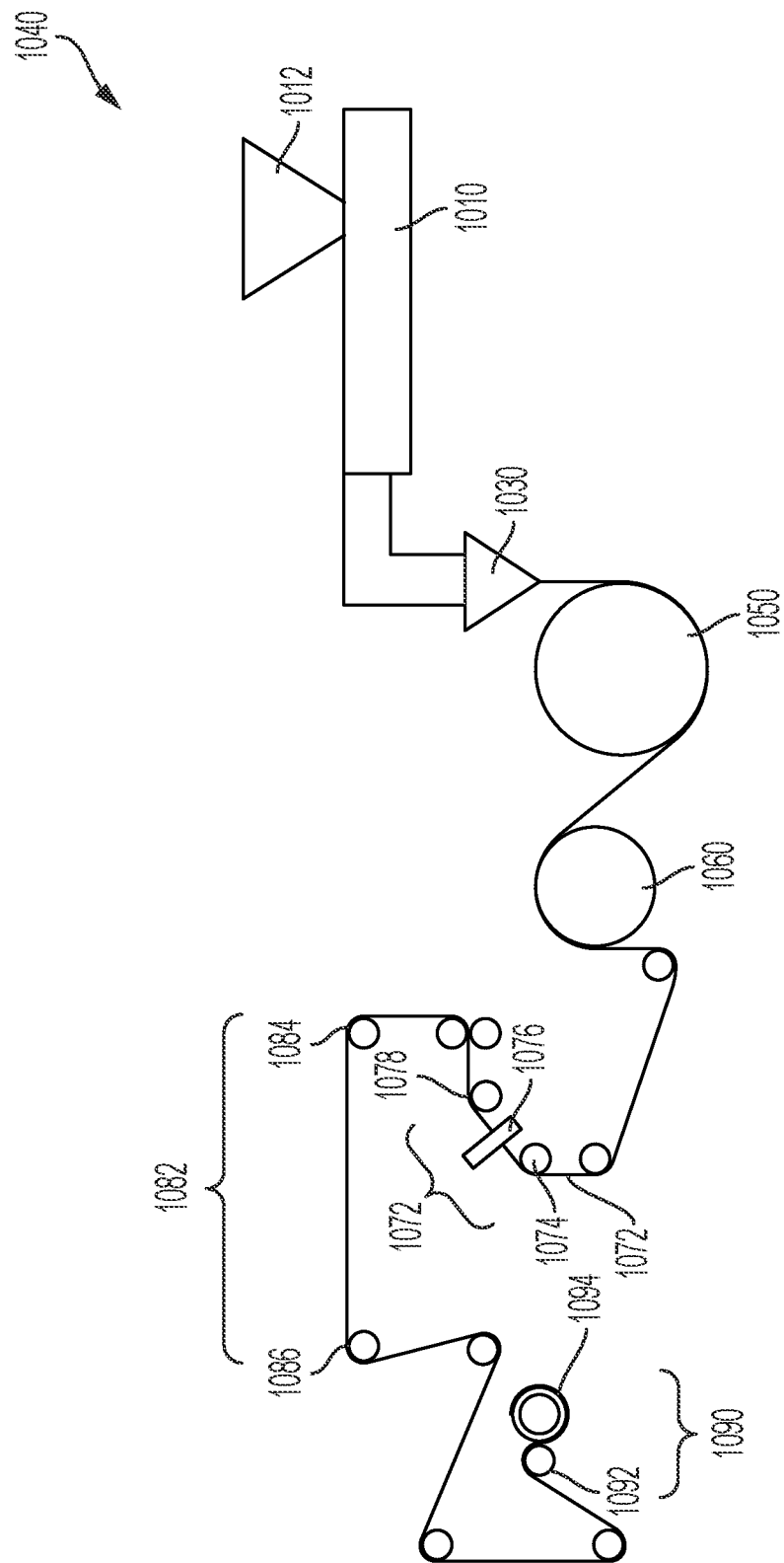
FIG. 10 shows a coextrusion line, under an embodiment.

Under one embodiment (and as described above), a continuous in-line film process includes coextrusion, slitting, in-line folding, and winding/oscillation/air entrapment. FIG. 10 provides a stylized side view of a coextrusion line implementing this continuous in-line process. FIG. 10 illustrates a process for producing a cast stretch film from molten resins 1000. The process comprises one or more extruders 1010 connected by transfer pipes 1020 to a die 1030. The number of extruders 1010 used in the apparatus depends upon the desired composition of the film.

For example, to produce a three-layer film from three distinct source materials, three extruders 1010 are used. In another example embodiment, to produce a five-layer film, three, four, or even five extruders 1010 are used depending on the number of distinct source materials.

According to other example embodiments, the extruders 1010 are connected to a source 1040 of stock resin. The extruders 1010 heat the stock resin to a molten state and deliver the molten resin to the die 1030 through the transfer pipes 1020. In example embodiments, the film is extruded through the die 1030 onto a casting roll 1050. In further example embodiments, the casting roll 250 is a 25-30 inch diameter casting roll having a set temperature. In still further example embodiments, the set temperature of the casting roll ranges from about 75° F. to 100° F. . . . ; in a presently preferred embodiment the casting roll has a set temperature of about 90° F.

In example embodiments, the film moves from the casting roll 1050 to a secondary chill roll 1060. According to example embodiments, the secondary chill roll is a 15-30 inch diameter secondary chill roll with a set temperature. As a further example embodiment, the set temperature of the secondary chill roll ranges from about 65° F. to 90° F., with a preferred value of about 85° F.

Under an embodiment, the film is then passed from the caster roll or the chill roll to a slitting assembly 1072. Since slitting assemblies are used to slit the film into multiple sections, for example, into one or more interior slit sections and one or more exterior slit sections. The film is then passed through a folding guides step 1072 comprising a roller 1074, one or more folding guide assemblies 1076, then another roller 1078. Under an embodiment, the film passes directly from roller 1074 to folding guide assemblies 1076 and then directly to the following roller 1078. This folding guide step is described in detail below in FIGS. 12-13 and corresponding disclosure. (The rollers 1074, 1078 and folding guide assembly 1076 corresponds to rollers 1220, 1230 and folding guide assembly 1235). The film then passes through a nip roll 1080 (corresponding to nip roll 1260). The process then oscillates the film using an oscillating mechanism 1082 comprising components 1084 and 1086. Under an embodiment, components 1084 and 1086 comprise parallel rollers. The rollers rotate in tandem (and along a common plane defined by the parallel longitudinal axes of the rollers) to a degree that causes a reciprocating lateral shift of the film in its path across and beyond the rollers, i.e. that causes lateral oscillation of the film. The process then implements winding and air entrapment 1090 using a retractable roll 1092 and film roll 1094. This winding and air entrapment process is described in detail below in FIG. 14 and corresponding disclosure. (The retractable roll 1092 and film roll 1094 correspond to retractable roll 1810 and film roll 1820).

Figure 11:
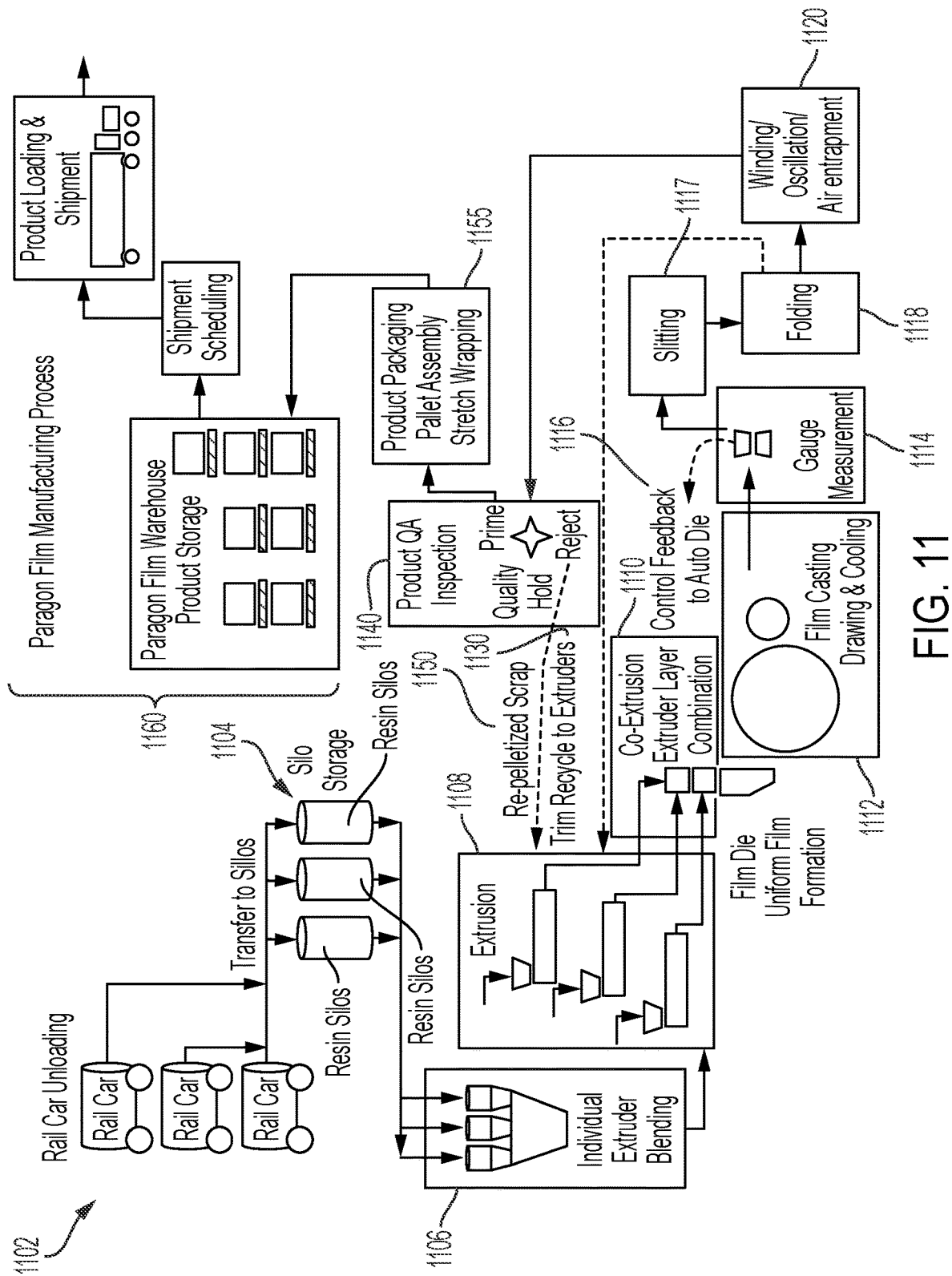
FIG. 11 shows provides an overview of a plastic film coextrusion process, under an embodiment.

FIG. 11 provides an overview of a plastic film coextrusion process producing an embodiment of a below referenced five layer film, under an embodiment. (Note that the overall process may also simply be referred to as an extrusion line). The process begins in sourcing the ingredients. As an example, and as detailed above, a manufacturing facility receives the plastics materials via rail car 1102 (or other means). Under an embodiment, materials are sourced to produce a five layer film (as described below). The materials include LLDPE Octene 1 MI and density 0.920, metallocene HPP or RCPP or mPP 9 MFR and density 0.900, and mLLDPE Octene 4 MI and density 0.918 but embodiments are not so limited. (Formulations of a film using these three resin ingredients are described in detail below under multiple embodiments. Of course, the extrusion line may be used with any number of source materials under alternative embodiments). The three ingredients may be delivered in pellet form ready for a coextrusion process. The materials are stored in resin silos 1104, under an embodiment. Thereafter, the materials are transferred to hoppers 1106 that feed extruders 1108. The three ingredients may be used to generate a five layer film comprising a formulation and composition as described in detail below. The extruders transition the materials from a solid state to a molten resin state and pass the resins through a die 1110 which then outputs a film in five layers. (Under an embodiment two of the extruders each produce two layers of the five layer film but embodiments may include any number of extruders each of which may produce any number of layers depending upon the specific formulation and number of source ingredients).

The film is then passed to a film casting drawing and cooling process 1112. An automated gauge measurement component 1114 iteratively scans the entire breadth of the film along a laterally reciprocating path. The measurements are fed 1116 back to the die in a control feedback loop. The feedback allows the die to adjust the coextrusion layer combination in order to maintain consistent film thickness. An integral part of the overall extrusion line process then slits 1117 the film into separate longitudinally divided sections. The edges of the film may then be folded 1118 (as described in detail below) immediately after the film is longitudinally slit into sections, under an embodiment. The process then implements a winding/oscillation/air entrapment 1120 process (as described in detail below).

The slitting process may generate trim material which is then recycled, i.e. fed 1130 back to the extruders for integration back into source material. The final product (film rolls) are then held for quality insurance 1140 purposes. Film that fails quality assurance inspection is then converted to re-pelletized scrap 1150 which may then be recycled back into source material, under an embodiment. The final product is then wrapped on-site 1155 or forwarded to warehouse storage 1160 for subsequent shipping to customers.

As a precursor to a folding process, a slitting assembly may slit the film into one or more longitudinally divided section. Slitting assemblies may be used to slit the film into multiple sections. An interior slit may be defined as a slit made somewhere within the original width of film, resulting in multiple sections of lesser width. Each interior slit may require only one folding guide assembly to accommodate both adjacent film edges. An exterior slit may be defined as a slit made along one of the edges of the original width of film. Each exterior edge may require a separate folding guide assembly.

Figure 12:
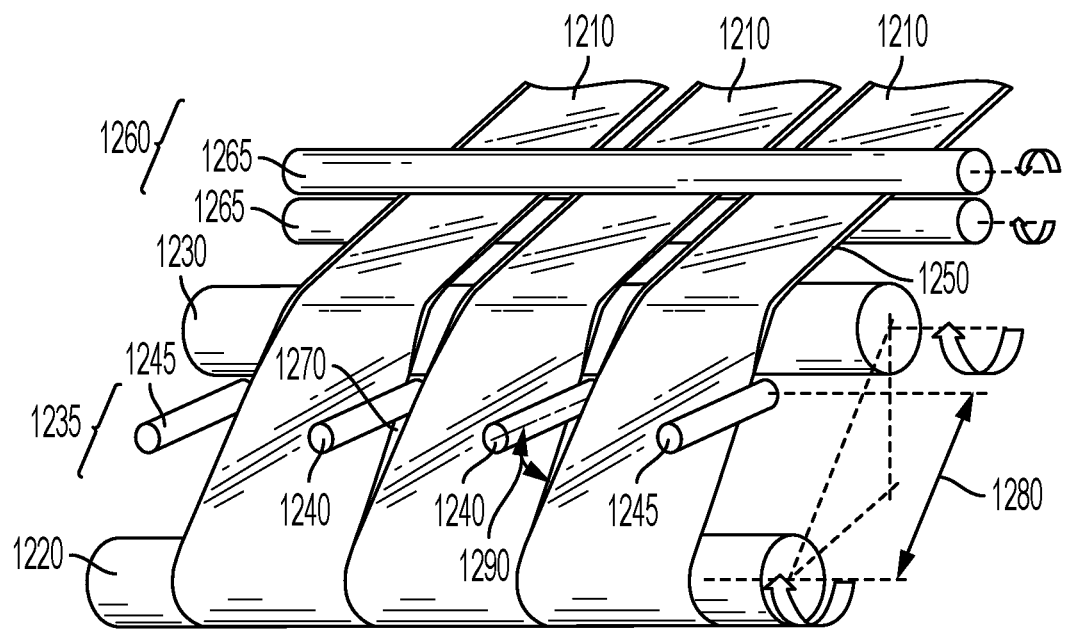
FIG. 12 shows a folding process, under an embodiment.

As shown in FIG. 12, the edges of the film may be folded immediately after the film is longitudinally slit into multiple sections, under an embodiment. The method for folding the edges of the film 1210 comprises a first roller 1220, a second roller 1230, and a plurality of folding guide assemblies 1235 also known as folding guides, placed between the first roller 1220 and the second roller 1230. Each folding guide assembly 1235 may be comprised of steel, aluminum, nylon, or any other material of sufficient modulus to be able to maintain rigidity with no one material demonstrating an advantage. Each folding guide assembly may also have a coefficient of friction that allows the edge of the film to turn back on itself, thus introducing a fold. The diameter and placement of the folding guide assemblies 1235 may be key factors in achieving and maintaining edge folds 1250 without roping or wrinkling of the film 1210.

The folding guide assemblies 1235 may be comprised of a plurality of folding rods 1240-1245, which may be placed in the slits 1270 between sections of film 1210 to separate the sections of film 1210. After the sections of film 1210 are separated, the cling agent and the tension of the film 1210 may cause the edge folds 1250 to form spontaneously. Each interior folding rod 1240 may produce two edge folds 1250, while each exterior folding rod 1245 may produce one edge fold 1250.

The folding rods 1240-1245 may vary from ⅜ inch to 1 inch in diameter, with a preferred diameter of approximately $^{11}/_{16}$ inch. The folding rods 1240-1245 may have uniform diameter throughout their length. As an alternative, the portions of the folding rods 1240-1245 that contact the film 1210 may have a smaller diameter or narrow to a point to further aid in separating the sections of film 1210.

The folding rods 1240-1245 may be placed in the slits 1270 between sections of the film 1210 at a guide distance 1280 and a guide angle 1290. The guide distance 1280 may be approximately ⅔ of the distance between the first roller 1220 and the second roller 1230, as measured from the point where the film 1210 leaves the first roller 1220 to the point where the film 1210 first contacts the folding rods 1240-1245. The guide angle 1290 between the film 1210 and the folding rods 1240-1245, measured with the folding rods 1240-1245 leaning toward the first roller 1220, may vary from 20° to 90°, with a preferred angle of approximately 45°.

Figure 13:
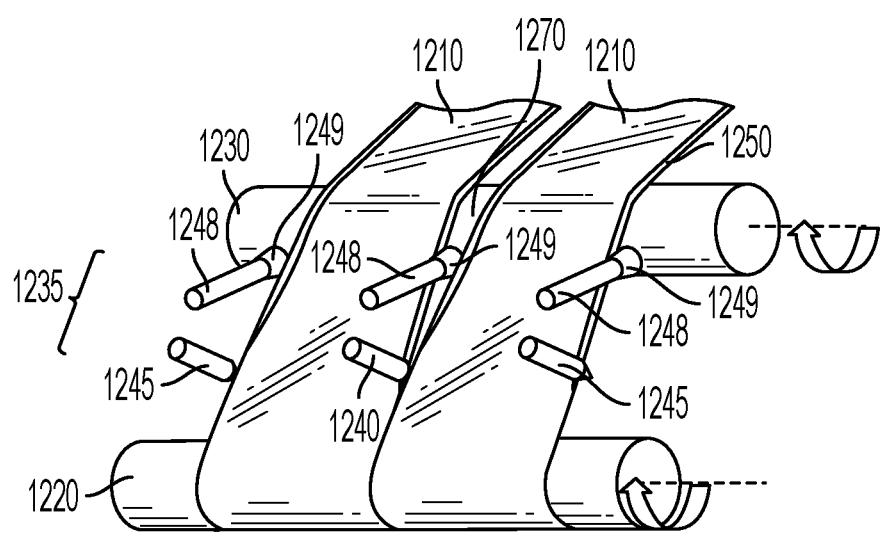
FIG. 13 shows a folding process, under an embodiment.

As shown in FIG. 13, the folding guide assemblies 1235 may also be comprised of a plurality of folding rods 1240-1245 and a plurality of re-folders 1248. Each folding rod 1240-1245 and each re-folder 1248 may be separate units that can be positioned independently. Alternatively, each folding rod 1240-1245 and each re-folder 1248 may be combined into a single unit. If the folding rod 1240-1245 and re-folder 1248 are combined into a single unit, their positions may be fixed or adjustable relative to each other.

The re-folders 1248 may be placed in the slits 1270 between sections (or at an outer edge) of the film 1210 after the folding rods 1240-1245 and before the second roller 1230. The re-folders 1248 may function to further separate the sections of film 1210 and to direct the film 1210 back onto itself at an angle that aids in re-establishing folds 1250 that are lost during the production process. Causes of lost folds 1250 include, but are not limited to, holes, gels, contaminated resins, flaws in the film, and other production problems.

The composition and diameter of the re-folders 1248 may be comparable to that of the folding rods 1240-1245. The re-folders 1248 may have uniform diameter throughout their length. However, as shown in FIG. 13, the portions 1249 of the re-folders 1248 that contact the film 1210 may be wider than the other portions of the re-folders 1248 in order to increase the amount of separation between adjacent sections of the film 1210. For example, the portions 1249 of the re-folders 1248 that contact the film 1210 may be capped by an inverted cone or sphere.

Figure 14:
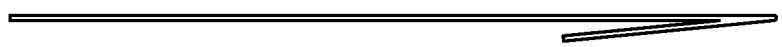
FIG. 14 shows examples of folds, under an embodiment.
Figure 15:
FIG. 15 shows examples of folds, under an embodiment.

As shown in FIG. 12, the means for folding the edges of the film 1210 may also comprise a nip roll assembly 1260. The nip roll assembly 1260 may consist of two rollers 1265 pressed together, and may be primarily intended to control the tension of the film 1210 as it passes through the slitting assembly and the edge folding apparatus. The nip roll assembly 1260 may also aid in pressing the folds 1250 into the film 1210, resulting in flat edge folds as shown in FIG. 14. If the nip roll assembly 1260 is not employed, air entrapment may occur within the edge folds as shown in FIG. 15. Air entrapment within the edge folds may result in a film roll with a different appearance and functionality, much like having bubble wrap on the ends of the roll.

The edge folds described above make the film less susceptible to failure due to tears, rough handling, dropping, or excessive stretching. Thus, the ability to introduce and maintain edge folds is a key component of film performance. Film failures caused by gels are highly dependent on location of the gel. Non-folded film is more susceptible to catastrophic tearing if a gel is located on the edge. Folded edge film mitigates this risk.

The film may be oscillated and wound onto film rolls after the edges of the film are folded. The present disclosure may use any conventional oscillating mechanism to oscillate the film. For example, the oscillating mechanism may be a frame that moves back and forth across a set distance in a controlled manner at a specified rate. The film may be supported by and move with the oscillating frame.

Figure 16:
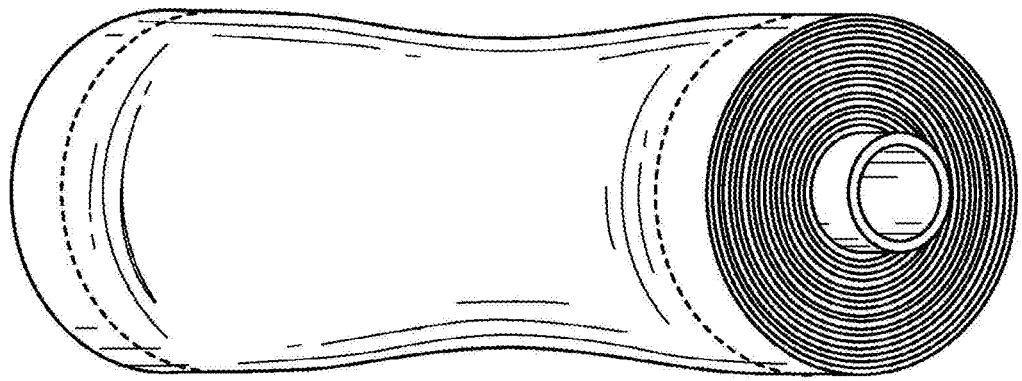
FIG. 16 shows a roll of film, under an embodiment.
Figure 17:
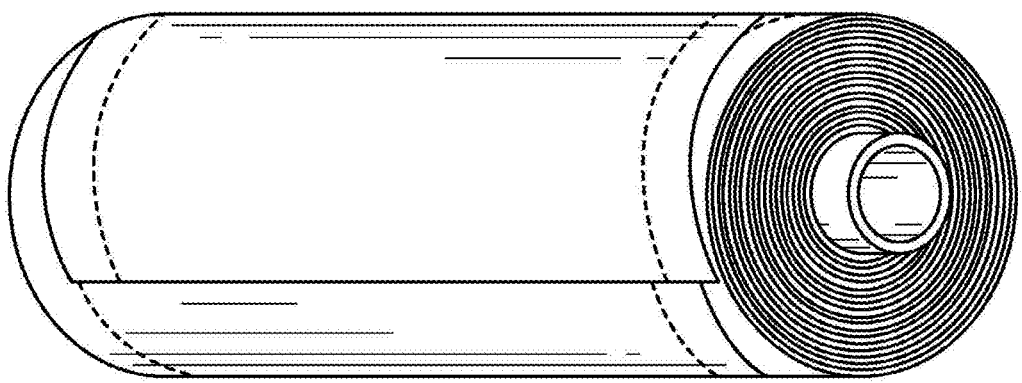
FIG. 17 shows a roll of film under an embodiment.

Oscillation may efficiently distribute the edge folds onto the film roll. If the film is not oscillated, the edge folds will stack up in one location, producing a film roll with hard, raised edges as shown in FIG. 16. The hard, raised edges are susceptible to damage and prevent the film from unwinding properly, resulting in film rolls that are unusable. In contrast, oscillation produces film rolls that are generally uniform, as shown in FIG. 17, and easy to unwind.

To prevent the edge folds from stacking up, the film may be oscillated for a distance that is greater than the combined width of the edge folds. For example, if each edge fold is approximately ¼ inch, the film may be oscillated approximately ⅝ inch to prevent stacking. The oscillation rate may range from 1 to 20 cycles per minute, with a preferred rate of approximately 7.5 cycles per minute.

Figure 18:
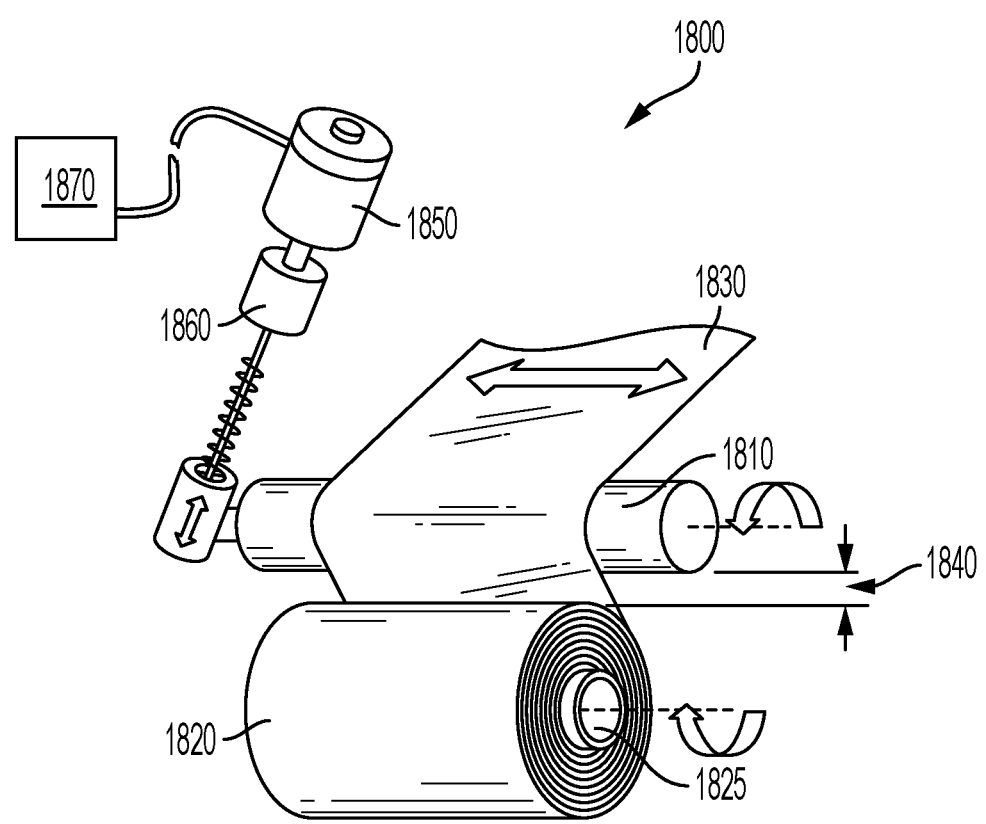
FIG. 18 shows a winding/oscillating/air entrapment process, under an embodiment.

Entrapping air between the layers of film as the film is wound onto a film roll also makes the film easier to unwind and less susceptible to damage. As shown in FIG. 18, the winding mechanism 1800 may be comprised of a retractable roll 1810 and a film roll 1820. The film roll 1820 may begin as a core 1825 onto which the film 1830 is wound and may gradually increase in size as multiple layers of film 1830 are wrapped around the core 1825.

The film 1830 may pass over the retractable roller 1810, which moves away from the film roll 1820 at a separation rate as the film roll 1820 increases in size. The separation rate may maintain a constant distance between the retractable roller 1810 and the surface of the film roll 1820, described as an air gap 1840. The air gap 1840 may be consistently maintained throughout the winding process in order to trap air between the layers of film 1830 as they are wound onto the film roll 1820. The air gap 1840 may be relatively short in order to maintain the appropriate level of air entrapment and to ensure proper oscillation of the film 1830. For example, the air gap 1840 may range from 0 to 5 inches, with a preferred distance of approximately one inch.

A mechanical system may be used to control the retractable roller 1810. The types of mechanical systems that may be used include, but are not limited to, motor driven jack screw assemblies 1850-1860, linear actuators, cams, pneumatically driven systems, and hydraulically driven systems. The mechanical system may be operated and controlled by any conventional method, including, but not limited to, a programmable logic control (PLC) system 1870 located within the winding mechanism 1800.

The in-line process described with respect to FIGS. 9-18 may be used to produce a film comprising five layers, under an embodiment. These five layers may comprise a combination of resins as described below (but embodiments are not so limited).

There are two types of resins often used in stretch film, cast film, or otherwise plastic films—Polyethylene and Polypropylene. Polyethylene is derived from an ethylene molecule while polypropylene is derived from propylene. (Additional resins and combinations thereof may be used under differing embodiments).

Polyethylene consists of hydrocarbon chains with the most basic component being the ethylene molecule, consisting of 2 carbon and 4 hydrogen atoms. When ethylene molecules are combined together in straight or branched chains, polyethylene is formed. This process involves splitting the double bond between the 2 carbon atoms and creating a free radical to join to the next ethylene molecule. Polyethylene is generally categorized by Density. High Density (above 0.940 g/cm$^3$), Low Density (below 0.930 g/cm$^3$), Linear Low Density (below 0.930 g/cm$^3$ and a co-monomer) are the most common types, called HDPE, LDPE, LLDPE for short.

LLDPE is categorized differently from LDPE due to its makeup of what is called Co-Monomers. Basically, this process includes adding another type of molecule to the chain besides Ethylene. In particular, LLDPE is a copolymer of ethylene and another longer olefin, which is incorporated to improve properties such as tensile strength or resistance to harsh environments. These a-olefins include 1-butene, 1-hexene, 4-methyl-1-pentene and 1-octene. Linear low density polyethylene (LLDPE) is characterized by short, random chain branching, with a density of 0.915 to 0.930 g/cc$^3$.

The melt index of LLDPE is a measure of the ease of flow of the melt of a thermoplastic polymer. It is defined as the mass of a polymer, in grams, flowing in ten minutes. For LLDPE, the measure comprises g/10 min at 190 degrees (according to ASTM D1238 @ 190C). Melt index also determines properties of LLDPE. In fact, Density and Melt Index generally define characteristics of LLDPE (among other factors). These characteristics are set forth in Table 1 below.

TABLE 1

General Guide to the Effects of Melt Index and Density on
Mechanical Properties and Processing of LLDPE

| Characteristic | As Melt Index Increases | As Density Increases |
| --- | --- | --- |
| Chemical Resistance | Stays the Same | Increases |
| Clarity | Increases | Increases |
| Elongation at Rupture | Decreases | Decreases |
| Extrusion Speed | Increases | Increases |
| Drawdown | Increases | Increases |
| Flexibility | Stays the Same | Decreases |
| Gloss | Increases | Stays the Same |
| Heat Resistance (softening point) | Stays the Same | Increases |
| Impermeability to Gases/Liquids | Stays the Same | Increases |
| Low Temperature Flexibility | Decreases | Decreases |
| Melt Viscosity | Decreases | Increases |
| Mechanical Flex Life | Decreases | Decreases |
| Stress Crack Resistance | Decreases | Decreases |
| Tensile Strength at Break | Decreases | Increases |
| Resistance to Blocking | Decreases | Increases |
| Stress Cracking Resistance | Decreases | Decreases |
| Tensile Strength at Rupture | Decreases | Increases |

Of course, the co-monomer itself also defines the properties of a film as described below:
Butene LLDPE
  Tear and puncture performance is poor
Hexene LLDPE
  Moderate to good tear and puncture performance
Octene LLDPE
  Typically tougher than hexenes of the same melt index and density (meaning better tear and puncture performance over hexene)

In addition to the Co-Monomer classification, there is also catalyst classification or a "how it's made" classification. Catalyst type is used to describe a process type, not ingredient. Catalysts may be used to change how the product is made with Ethylene and a Co-Monomer. Ethylene and Co-Monomers are generally all considered equal, it's the catalyst that changes the film. Common catalyst categories are Ziegler-Natta (common medium grade) and Metallocene (Premium grade). Each type of LLDPE (i.e., Butene, Octene, Hexene, and Methyl Pentene LLDPE) are generated using a Ziegler-Natta catalyst, under an embodiment. In fact, reference to LLDPE generally indicates use of a Ziegler-Natta catalyst. In contrast Metallocene catalyst may be used to generated a metallocene LLDPEs generally referred to as mLLPDE. Metallocene polyethylene, also known as mPE or mLLDPE, is a single site catalyzed LLDPE, which results in a more uniform material. mPE typically has a very even chain branching. Its density ranges from 0.870 to 0.965 g/cc$^3$. Note that an mLLDPE may comprise mLLDPE hexene, mLLDPE Butene, or mLLDPE Octene.

Polypropylene is a thermoplastic resin built up by the polymerization of the propylene monomer. Polypropylene is a tough, rigid, and crystalline thermoplastic. Polypropylene comes either as homopolymer or as copolymer. Note that the Melt Flow Rate (or MFR and similar to Melt Index) is a measure of the ease of flow of the melt of a polypropylene. It is defined as the mass of a polypropylene, in grams, flowing in ten minutes. MFR comprises g/10 min at 230 degrees (according to ASTM D1238 @ 230C).

Polypropylene homopolymers (HPP) are thermoplastic resins produced through the polymerization of propylene. The use of metallocene catalysts in the production of HPP results in resins (referred to as mHPP) with the following property: High cross directional tear resistance.

A random copolymer is one in which monomer residues are located randomly in the polymer molecule. Polypropylene random copolymers are thermoplastic resins produced through the polymerization of propylene, with ethylene bonds introduced in the polymer chain. The resins provide a broad range of characteristics, and are used in a wide range of applications. Accordingly, Random Copolymer Polypropylene (RCPP) comprises a polypropylene copolymer containing a Small (2-6% by weight) amount of ethylene.

A Metallocene copolymer is one in which monomer residues are located uniformly throughout the polymer molecule. Polypropylene copolymers are thermoplastic resins produced through the polymerization of propylene, with ethylene bonds introduced in the polymer chain. The resins provide a broad range of characteristics, and are used in a wide range of applications. Accordingly, Metallocene Polypropylene (mPP) comprises a polypropylene copolymer containing a Small (0.05%-3% by weight) amount of ethylene. The use of metallocene catalysts in the production of PP results in resins (referred to as mPP) with the following properties: High cross directional tear strength with improved compatibility with PE and reduction of strain whitening.

Under an embodiment, a five layer film is produced by the in-line methods described herein (see FIGS. 7-8 and FIGS. 9-18). The three components of the five layer film comprise the following:

1. LLDPE Octene 1 MI Subskin (36% for each subskin measured by weight pre melt; alternatively each subskin may comprise 15-40% measured by weight pre melt with each subskin comprising an equal percentage within this range but embodiments are not so limited to equal percentages)
   Range of MI from 0.5 to 2
   Actual density 0.920
   Range of Density from 0.916-0.922
2. Metallocene homopolymer polypropylene (mHPP) core (12% by weight measured pre melt; the core may comprise 5-20% measured by weight pre melt)
   MFR (similar to MI) of 9. Range of 5-20 MFR
   Actual Density 0.900
   Range of 0.870 to 0.915
3. Metallocene LLDPE Octene (mLLDPE octene) 4 MI Skin (8% by weight measure pre melt; alternatively each skin may comprise 5-15% measured by weight pre melt with each skin comprising an equal percentage within this range but embodiments are not so limited to equal percentages)
   Range of MI 3-5
   Actual density 0.918
   Range of density 0.916-0.922

Under the embodiment described immediately above, the five-layer film comprises a two layer mLLDPE Octene Skin, a mHPP core, and a LLDPE Octene Subskin. In other words, the mLLDPE Octene Skin comprises two outer skin layers, the LLDPE Octene Subskin comprises the two next inwardly successive subskin layers, and the mHPP core comprises a core layer between the subskin layers.

Under an embodiment, a five layer film is produced by the in-line methods described herein (see FIGS. 7-8 and FIGS. 9-18). The three components of the five layer film comprise the following:

1. LLDPE Octene 1 MI Subskin (36% for each subskin measured by weight pre melt; alternatively each subskin may comprise 15-40% measured by weight pre melt with each subskin comprising an equal percentage within this range but embodiments are not so limited to equal percentages)
   Range of MI from 0.5 to 2
   Actual density 0.920
   Range of Density from 0.916-0.922
2. Random copolymer polypropylene (RCPP) core (12% by weight measured pre melt; the core may comprise 5-20% measured by weight pre melt)
   MFR (similar to MI) of 9. Range of 5-20 MFR
   Actual Density 0.900
   Range of 0.870 to 0.910
3. Metallocene LLDPE Octene (mLLDPE octene) 4 MI Skin (8% by weight measured pre melt; alternatively each skin may comprise 5-15% measured by weight pre melt with each skin comprising an equal percentage within this range but embodiments are not so limited to equal percentages)
   Range of MI 3-5
   Actual density 0.918
   Range of density 0.916-0.922

Under the embodiment described immediately above, the five layer film comprises a two layer mLLDPE Octene Skin, a RCPP core, and a LLDPE Octene Subskin. In other words, the mLLDPE Octene Skin comprises two outer skin layers, the LLDPE Octene Subskin comprises the two next inwardly successive subskin layers, and the RCPP core comprises a core layer between the subskin layers.

Under an embodiment, a five layer film is produced by the in-line methods described herein (see FIGS. 7-8 and FIGS. 9-18). The three components of the five layer film comprise the following:

1. LLDPE Octene 1 MI Subskin (36% for each subskin measured by weight pre melt; alternatively each subskin may comprise 15-40% measured by weight pre melt with each subskin comprising an equal percentage within this range but embodiments are not so limited to equal percentages)
   a. Range of MI from 0.5 to 2
   b. Actual density 0.920
   c. Range of Density from 0.916-0.922
2. Metallocene polypropylene (mPP) core (12% by weight measured pre melt; the core may comprise 5-20% measured by weight pre melt)
   a. MFR (similar to MI) of 9. Range of 5-20 MFR
   b. Actual Density 0.900
   c. Range of 0.870 to 0.915
3. Metallocene LLDPE Octene (mLLDPE octene) 4 MI Skin (8% by weight measured pre melt; alternatively each skin may comprise 5-15% measured by weight pre melt with each skin comprising an equal percentage within this range but embodiments are not so limited to equal percentages)
   a. Range of MI 3-5
   b. Actual density 0.918
   c. Range of density 0.916-0.922

Under the embodiment described immediately above, the five-layer film comprises a two layer mLLDPE Octene Skin, a mPP core, and a LLDPE Octene Subskin. In other words, the mLLDPE Octene Skin comprises two outer skin layers, the LLDPE Octene Subskin comprises the two next inwardly successive subskin layers, and the mPP core comprises a core layer between the subskin layers.

Under an embodiment, the five layer film (as described above) may comprises six (6) microns or less.

Under an alternative embodiment, one or more of the source materials (and corresponding layers) may be incorporated into films of additional or fewer layers, wherein the one or more source materials (and corresponding layers) may comprise the same or differing parameters and/or ranges of parameters, e.g. MI/MFR, density, % by weight, etc.

Primary and Secondary Anti-Oxidants may be added to LLDPE. Primary are typically Phenolics, Secondary are typically Phosphites.

A multi-layer plastic film is described under an embodiment comprising at least one first layer comprising a metallocene linear low density polyethylene (mLLDPE) octene resin. The multi-layer plastic film includes at least one second layer comprising a linear low density polyethylene (LLDPE) octene resin. The multi-layer plastic film includes at least one third layer comprising a polypropylene (PP) resin, wherein the at least one third layer comprises one of a metallocene homopolymer polypropylene (mHPP) resin, a random copolymer polypropylene (RCPP) resin, and a metallocene polypropylene (mPP) resin. The multi-layer plastic film includes the multi-layer plastic film comprising a thickness of six microns or less.

The mLLDPE octene resin comprises a melt index of 4 g/10 min at 190 degrees, under an embodiment.

The mLLDPE octene resin comprises a melt index from 3 to 5 g/10 min at 190 degrees, under an embodiment.

The mLLDPE octene resin comprises a density of 918 g/cm$^3$, under an embodiment.

The mLLDPE octene resin comprises a density from 0.916 to 0.922 g/cm$^3$, under an embodiment.

The LLDPE octene resin comprises a melt index of 1 g/10 min at 190 degrees, under an embodiment.

The LLDPE octene resin comprises a melt index from 0.5 to 2 g/10 min at 190 degrees, under an embodiment.

The LLDPE octene resin comprises a density of 0.920 g/cm$^3$, under an embodiment.

The LLDPE octene resin comprises a density from 0.916 to 0.922 g/cm$^3$, under an embodiment.

The PP resin comprises a melt flow rate of 9 g/10 min at 230 degrees, under an embodiment.

The PP resin comprises a melt flow index from 5 to 20 g/10 min at 230 degrees, under an embodiment.

The PP resin comprises a density of 0.900 g/cm$^3$, under an embodiment.

The PP resin comprises a density from 0.870 to 0.910 g/cm$^3$, under an embodiment.

An outer two layers of the multi-layer film comprises the mLLDPE octene resin, wherein the at least one first layer comprises the outer two layers, under an embodiment.

A next two inwardly successive layers of the multi-layer film comprises the LLDPE octene resin, wherein the at least one second layer comprises the outer two layers, under an embodiment.

A core layer of the multi-layer film comprises the PP resin, wherein the at least one third layer comprises the core layer, under an embodiment.

A method for producing a film is described under an embodiment, the method comprising providing a plurality of source materials for a coextrusion process, wherein the plurality of source materials comprises a metallocene linear low density polyethylene (mLLDPE) octene material, a linear low density polyethylene (LLDPE) octene material, and a polypropylene (PP) material. The method includes coextruding the plurality of materials into molten resins in producing the film. The method includes slitting the film into a plurality of sections. The method includes passing the plurality of sections across a first roller. The method includes moving the plurality of sections from the first roller to and through a folding mechanism, wherein the folding mechanism comprises one or more folding rods, wherein the movement through the folding mechanism comprises passing at least one edge of the plurality of sections along a corresponding folding rod of the one or more folding rods, wherein the corresponding folding rod of the one or more folding rods causes the at least one passing edge to fold upon itself and create an edge fold, wherein the edge fold comprises a first surface of the at least one passing edge clinging a second surface of the at least one passing edge.

The coextruded film comprises a multi-layer film, under an embodiment.

An outer two layers of the multi-layer film comprises the mLLDPE octene resin, under an embodiment.

A next two inwardly successive layers of the multi-layer film comprises the LLDPE octene resin, under an embodiment.

A core layer of the multi-layer film comprises the PP resin, under an embodiment.

The PP resin comprises a metallocene homopolymer polypropylene (mHPP) resin, under an embodiment.

The PP resin comprises a random copolymer polypropylene (RCPP) resin, under an embodiment.

The PP resin comprises a metallocene polypropylene (mPP) resin, under an embodiment.

The multi-layer film comprises six (6) microns or less, under an embodiment.

A method for producing a film is described herein under an embodiment, the method comprising, providing a plurality of source materials for a coextrusion process, wherein the plurality of source materials comprises a metallocene linear low density polyethylene (mLLDPE) octene material, a linear low density polyethylene (LLDPE) octene material, and a polypropylene (PP) material. The method includes coextruding the plurality of materials into molten resins in producing the film. The method includes slitting the film into a plurality of sections. The method includes moving the plurality of sections through a folding mechanism, wherein the folding mechanism produces edge folds at edges of the plurality of sections. The method includes oscillating the folded plurality of sections. The method includes passing the folded plurality of section over a retractable roller that is parallel to a film roll and moves vertically away from the film roll at a separation rate that maintains a distance between the retractable roller and the film roll. The method includes winding the folded plurality of sections onto the film roll.

The coextruded film comprises a multi-layer film, under an embodiment.

An outer two layers of the multi-layer film comprises the mLLDPE octene resin, under an embodiment.

A next two inwardly successive layers of the multi-layer film comprises the LLDPE octene resin, under an embodiment.

A core layer of the multi-layer film comprises the PP resin, under an embodiment.

The PP resin comprises a metallocene homopolymer polypropylene (mHPP) resin, under an embodiment.

The PP resin comprises a random copolymer polypropylene (RCPP) resin, under an embodiment.

The PP resin comprises a metallocene polypropylene (mPP) resin, under an embodiment.

The foregoing disclosure and is not intended to describe all possible aspects of the described embodiments. While embodiments set forth herein are described in detail, those of ordinary skill in the art will appreciate that minor changes to the description, and various other modifications, omissions and additions are also made without departing from the spirit or scope of the embodiments.

The invention claimed is:

1. A method comprising:
providing a plurality of source materials for a coextrusion process, wherein the plurality of source materials comprises a metallocene linear low density polyethylene (mLLDPE) octene material, a linear low density polyethylene (LLDPE) octene material, and a polypropylene (PP) material, wherein at least one of the plurality of source materials comprises a recycled source material;
filtering the at least one of the plurality of source materials comprising the recycled source material;
coextruding the plurality of source materials from a single die to form a film with five layers;
slitting the film into a plurality of sections;
moving the plurality of sections through a folding mechanism, wherein the folding mechanism produces edge folds at edges of the plurality of sections, wherein the step of filtering is configured to prevent downstream passage of melt impurities and/or gels from the recycled source material from causing lost folds;
oscillating the plurality of sections;
passing the plurality of sections over a retractable roller that is parallel to a film roll and moves vertically away from the film roll at a separation rate that maintains a distance between the retractable roller and the film roll; and
winding the plurality of sections onto the film roll.

2. The method of claim 1, wherein an outer two layers of the multi-layer film comprises the mLLDPE octene material.

3. The method of claim 2, wherein a next two inwardly successive layers of the multi-layer film, with respect to the outer layers, comprises the LLDPE octene material.

4. The method of claim 3, wherein a core layer of the multi-layer film comprises the PP material.

5. The method of claim 4, wherein the PP material comprises a metallocene homopolymer polypropylene (mHPP) resin.

6. The method of claim 4, wherein the PP material comprises a random copolymer polypropylene (RCPP) resin.

7. The method of claim 4, wherein the PP material comprises a metallocene polypropylene (mPP) resin.

8. The method of claim 1, wherein the multi-layer film has an overall thickness of six (6) microns or less.

9. The method of claim 1, wherein the step of slitting generates trim material and wherein the recycled source material comprises the trim material.

10. The method of claim 1, wherein the recycled source material comprises re-pelletized scrap.

11. The method of claim 1, wherein the step of filtering comprises passing the at least one source material comprising the recycled source material through a metallic mesh.

12. The method of claim 11, further comprising continuously regenerating the metallic mesh.

13. The method of claim 1, wherein the step of filtering comprises continuously filtering.

14. A method comprising:
providing a plurality of source materials for a coextrusion process, wherein the plurality of source materials comprises a metallocene linear low density polyethylene (mLLDPE) octene material, a linear low density polyethylene (LLDPE) octene material, and a polypropylene (PP) material, wherein at least one of the plurality of source materials comprises a recycled source material;

filtering the at least one of the plurality of source materials comprising the recycled source material;

coextruding the plurality of source materials into a multi-layer film having a first outer layer and a second outer layer each comprising the mLLDPE octene material, wherein the multi-layer film has a total thickness of six (6) microns or less;

slitting the film into a first section and a second section;

passing the first and second sections across a first roller; and moving the first and second sections directly from the first roller past a folding rod so that the folding rod folds an edge of the first section upon itself and creates a first edge fold with the first outer layer of the first section clinging to the second outer layer of the first section, wherein the step of filtering is configured to prevent downstream passage of melt impurities and/or gels from the recycled source material from causing lost folds.

15. The method of claim 1, wherein the coextruding step further comprises:

producing a core layer comprising the PP material; and producing a successive layer on each side of the core layer between the core layer and the first and second outer layers, respectively, wherein the successive layers each comprises the LLDPE octene material.

16. The method of claim 15, wherein the PP material comprises a material selected from a group consisting of a metallocene homopolymer polypropylene (mHPP) resin, a random copolymer polypropylene (RCPP) resin, and a metallocene polypropylene (mPP) resin.

17. The method of claim 14, wherein the step of moving the first and second sections past the folding rod further comprises:

moving the first and second sections directly from the first roller past the folding rod so that the folding rod folds an edge of the second section upon itself and creates a second edge fold with the first outer layer of the second section clinging to the second outer layer of the second section.

18. The method of claim 14, further comprising, after the step of moving the first and second sections past the folding rod, passing the first and second sections directly from the folding rod across a second roller.

19. The method of claim 18, further comprising, after the step of passing the first and second sections across the second roller, passing the first and second sections through a nip roll assembly.

20. The method of claim 19, further comprising, after the step of passing the first and second sections through the nip roll assembly, the steps of:

oscillating the first section;

passing the first section over a retractable roller that is parallel to a film roll and moves vertically away from the film roll at a separation rate that maintains a distance between the retractable roller and the film roll; and winding the first section onto the film roll.

21. The method of claim 14, wherein the step of slitting generates trim material and wherein the recycled source material comprises the trim material.

22. The method of claim 14, wherein the recycled source material comprises re-pelletized scrap.

23. The method of claim 14, wherein the step of filtering comprises passing the at least one source material comprising the recycled source material through a metallic mesh.

24. The method of claim 23, further comprising continuously regenerating the metallic mesh.

25. The method of claim 14, wherein the step of filtering comprises continuously filtering.

* * * * *